United States Patent [19]

Cohen et al.

[11] 3,964,832

[45] June 22, 1976

[54] GEL COMPOSITION AND ADHESIVE STICK

[75] Inventors: Norman B. Cohen, Wayland; Donald J. Lennon, Acton, both of Mass.

[73] Assignee: The Carter's Ink Company, Cambridge, Mass.

[22] Filed: June 17, 1974

[21] Appl. No.: 479,801

[52] U.S. Cl.................................. 401/75; 252/316; 260/23 R; 260/23.5 R; 260/27 R; 260/29.6 M; 260/33.4 R
[51] Int. Cl.²......................................... B43K 21/08
[58] Field of Search........... 260/27 R, 23 R, 23.5 R; 117/68.5; 401/49, 75, 72; 252/316, DIG. 11

[56] References Cited

UNITED STATES PATENTS

| | | | |
|---|---|---|---|
| 2,275,957 | 3/1942 | Groff | 260/23 |
| 3,096,202 | 7/1963 | Von Arx | 117/68.5 |
| 3,333,740 | 8/1967 | Waller | 401/75 X |
| 3,576,776 | 4/1971 | Muszik et al. | 260/22 |
| 3,612,704 | 10/1971 | Marchant | 401/72 |
| 3,817,887 | 6/1974 | Mestetsky | 260/23 R |

OTHER PUBLICATIONS

"Condensed College Dictionary" Reinhold, 1966, p. 391 relied on.
Condensed Chemical Dictionary; Reinhold Publishing Corp.; 1966; p. 839.
Skeist; Handbook of Adhesives; Reinhold Publishing Corp.; 1962; p. 190.

*Primary Examiner*—Lewis T. Jacobs
*Attorney, Agent, or Firm*—Kenway & Jenney

[57] ABSTRACT

A gel composition suitable for use as a carrier for adhesives, dyes, pigments or the like is formed from a Group II metal salt or Group III metal salt of an aliphatic carboxylic acid having from 8 to 36 carbon atoms and a chelating agent for the metal, dispersed or dissolved in a liquid dispersant that can be water, a water-miscible organic solvent or a mixture of water and at least one water-miscible organic solvent. The gel contains from about 80 to 96 percent by weight of the liquid and the mole ratio of the salt to chelating agent employed is between about 0.5 to 1 and 2 to 1. When employed as an adhesive carrier, the gel contains from 5 to 45 weight percent, based upon the total weight of the adhesive composition, of a water soluble or water dispersible film-forming adhesive such as polyvinylpyrrolidone.

29 Claims, 1 Drawing Figure

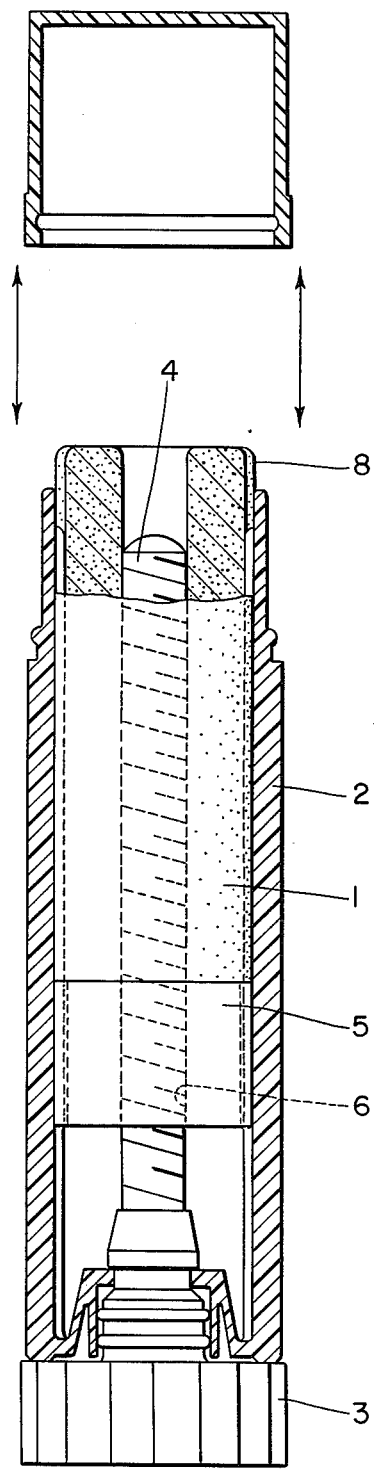

3,964,832

GEL COMPOSITION AND ADHESIVE STICK

BACKGROUND OF THE INVENTION

This invention relates to a gel composition useful as a carrier for a composition to be dispersed, an adhesive composition incorporating the gel and to the method for preparing the gel.

Prior to the present invention, adhesive compositions have been known which are useful for forming an adhesive stick which generally takes the form of a relatively soft adhesive composition enclosed in a generally cylindrical housing. The adhesive composition can be progressively moved out of the housing to expose a portion thereof so that the exposed portion can be rubbed upon a suitable substrate to coat the substrate. The physical characteristics of the adhesive composition must be regulated so that excessive adhesive is not applied to the substrate during rubbing but while avoiding the need for excessive rubbing force which could cause the substrate to be damaged or ripped. The adhesive composition must also provide a relatively strong bond when dried and the bond so produced must be able to withstand normal atmospheric conditions over a relatively long period so that the bond can be maintained. The adhesive composition should provide a strong bond so that it is useful for bonding a wide variety of paper products such as paper sheets, photographs and cardboards. In addition, the adhesive composition should have a relatively long shelf life of about two years in that it should not crack when exposed to severe cold nor should it melt at temperatures below about 130°F. Furthermore, the adhesive composition should provide a tear bond within a short period of time after application of within about twenty seconds.

An exemplary adhesive stick composition is disclosed by U.S. Pat. No. 3,576,776 to Muszik et al. This adhesive composition comprises a film-forming polymeric component and a gel comprising water or a mixture of water with an organic solvent and a water soluble salt of a long chain carboxylic acid. While this adhesive composition has been found to be somewhat satisfactory, the strength of the bond produced therewith is neither as strong nor as stable as would be desirable. In an important aspect, the adhesive compositions disclosed by this patent suffer the significant disadvantage that they are not remeltable. This places severe restrictions upon the processing conditions which can be employed in forming the adhesive compositions. Thus, for example, once the adhesive composition has been formulated it cannot be allowed to gel by virtue of cooling of the liquid portion of the composition since, in the gelled condition, it could not conveniently be placed into the housing for the adhesive stick.

Furthermore, the gel system disclosed in the Muszik patent must be prepared in a manner which is costly and which causes problems in maintaining a uniform composition throughout the gel preparation process. The Muszik gel must be maintained hot prior to adding the adhesive component in order to prevent premature gelling. This is undesirable since heating costs are high. Also, the liquid dispersant is being evaporated and condensed continuously during mixing which may cause liquid losses over the processing time required. It would be desirable to form the gel subsequent to dispersing the composition to be carried by the gel with a solution of one component of the gel so that the composition to be carried can be homogeneously dispersed therein. Furthermore, such a procedure would be desirable since heating requirements and evaporation losses would be minimized thereby.

Furthermore, it would be desirable to provide an adhesive composition which can be applied easily to a substrate, is temperature-stable and forms a strong bond. In a particular aspect, it would be highly desirable to provide an adhesive composition which is remeltable to facilitate processing to form an adhesive stick but which is capable of withstanding relatively high temperatures in the order of at least 130°F.

SUMMARY OF THE INVENTION

The gel composition of this invention comprises a liquid dispersant which can be water, an orgaic solvent or a mixture of water and a water-miscible organic solvent, Group II metal salt or a Group III metal salt of an aliphatic carboxylic acid having from 8 to 36 carbon atoms and a chelating agent for the metal ion. Thus, the composition so-formed can be melted and poured into a holder suitable for forming an adhesive stick, regardless of the elapsed time after initial formulation.

The gel composition can be formed by first admixing the chelating agent with the liquid dispersant to form a solution of the chelating agent. Thereafter, the adhesive or other composition to be dispersed is added to the solution to form a resultant homogeneous solution or dispersion. These steps can be conducted at normal room temperature, and there is no time requirement for adding the acid salt subsequently. Thus, stock solutions of the gel precursor composition can be formed with efficiencies attendant therewith.

DESCRIPTION OF SPECIFIC EMBODIMENTS

For convenience, this invention will be described with specific reference to the formation of an adhesive-gel composition. It is to be understood that the gel composition of this invention can be employed as a carrier for a wide variety of compositions such as pigments, soaps, odorants, dyes, antiperspirants or the like.

The chelating agent useful in the present invention is water soluble and functions to chelate the metal ion of the carboxylic acid salt so that the salt is solubilized in the liquid dispersant employed. Representative chelating agents include water soluble salts of ethylenediaminetetraacetic acid, triethanolamine, ethylendiamine, glutaric acid, oxalic acid, glycine or the like. It is preferred to employ water soluble salts of ethylenediaminetetraaceticacid, particularly the tetrasodium salt of ethylenediaminetetraaceticacid.

For the purposes of this invention, any Group II metal salt or Group III metal salt of an aliphatic carboxylic acid having between 8 and 36 carbon atoms can be employed; preferably the fatty acids having from 12 to 22 carbon atoms. The salt can be derived from an alkanoic acid, an alkenoic acid, alkadienoic acid or their monohalogen substituted acids. None of these salts normally are water soluble and therefore, it is surprising that they are useful to form adhesive sticks. However, the chelating agent in combination with the salt serves to disperse or solubilize the salt and form a gel.

Suitable liquid dispersants include water, a mixture of water and a water-miscible organic solvent or an organic solvent alone. It is preferred to employ a mixture of water and/or organic solvent. Suitable organic solvents include alkanols such as methyl alcohol, ethyl alcohol, butyl alcohol, isopropanol, ethylene glycol, diethylene glycol, glycerine, sorbitol, propylene glycol or the like. In a preferred aspect of the present invention, a mixture of water, ethyl alcohol and glycerine is employed.

The adhesive component of the adhesive stick can comprise a water soluble or a water dispersible film-forming polymer. Exemplary suitable polymers include those listed in the above-referred-to Muszik patent which is incorporated herein by reference. The preferred film-forming polymer comprises polyvinylpyrrolidone having an average molecular weight of between about 40,000 and 360,000.

The relative proportions of the film-forming adhesive, the liquid dispersant and the combination of the metal salt and chelating agent are regulated to produce a composition having a softness which promotes ease of application without the requirement of excess application pressures which may damage the substrate to which the adhesive is applied. Generally, the liquid dispersant, whether it be water or an organic solvent only or a mixture thereof, is employed in amounts of between about 40 and about 80 weight percent, preferably between about 60 and about 70 weight percent based upon the weight of the total composition. The mixture of the acid salt and chelating agent is between about 4 and about 12 weight percent preferably between about 6 and about 8 weight percent based upon the total weight of the composition. The ratio of the acid salt and chelating agent is such as to promote relatively complete solubility of the acid salt in the liquid dispersant while forming a gel. Generally, the weight ratio of acid salt to chelating agent is between about 0.5:1 and about 2:1; preferably about 1:1. The film-forming adhesive is employed in amounts of between about 5 and about 45 weight percent, preferably between about 25 and about 35 weight percent.

It is to be understood that the adhesive stick compositions of the present invention also can contain the usual additives which are relatively inert with respect to the adhesive strength of the composition. Representative suitable additives include plasticizers, stabilizers, fillers, odor regulating compositions, dyes, pigments preserving-agents or the like.

The adhesive stick composition can be formed by first forming a solution of all or of a portion of the liquid dispersant being employed and thereafter adding the chelating agent while stirring until the chelating agent is dissolved. Thereafter, the adhesive and the normally employed inert additive such as fillers, dyes, pigments, odor regulators or the like are added either alone or in admixture and stirred until a homogeneous solution or dispersion is attained. Thereafter, the solution is heated and the acid salt is added to the heated solution either alone or admixed with the remainder of the liquid dispersant employed. During the latter addition, the stirring and heating of the solution is maintained so that adequate contact between the chelating agent and the acid salt is attained and the acid salt becomes dissolved in solution. At this point, the composition is in the form of a pourable liquid solution and can be poured into a container formed of a material which is relatively vapor impermeable. Thus, the container can comprise metal or plastic or the like. After the solution is pourable into the container, the liquid portion of the composition is allowed to cool until a gel composition is attained. Thereafter, the container is capped to prevent excessive evaporation so that the resultant composition does not crumble and is in the form which is easy to apply to a substrate.

While the above-described process is the preferred, it is to be understood that the compositions of this invention also can be prepared by first mixing the acid salt and the chelating agent in the liquid dispersant. The composition can be allowed to gel by cooling or maintained hot. Thereafter, the adhesive and additive are added to the gel-forming composition in liquid form and mixed homogeneously therein. The resultant composition then is cooled to form a gel containing the adhesive.

The accompanying FIG. is an elevational view, in partial cross section, of an adhesive stick employing the gel-adhesive composition of this invention.

Referring to the FIG., the adhesive composition 1 has a generally cylindrical form and is retained within cylindrical housing 2. The vertical position of the adhesive stick 1 within housing 2 is adjusted by rotating knob 3, which is attached to threaded shaft 4. Shaft 4, when rotated, acts upon retainer 5 which has a threaded bore 6 so that retainer 5 is caused to move along the length of shaft 4 thereby exposing a portion of stick 1. Any other available means for progressively exposing the adhesive may be employed as the adhesive housing. Thus, the rotatable knob and threaded shaft need not be employed and the retainer, without a hole, can be pushed upward with a finger.

The following examples illustrate the present invention and are not intended to limit the same.

EXAMPLE I

In a one liter three-necked flask provided with a thermometer and a stirrer, 173.6 grams of demineralized water and 63.0 grams of glycerine were stirred until a homogeneous solution was obtained. Thereafter, 23.8 grams of the tetrasodium salt of ethylenediaminetetraaceticacid was added to the solution which was then stirred until a homogeneous solution was obtained. Thereafter, while the solution was stirred, 23.8 grams of calcium stearate, 224.7 grams of ethyl alcohol, 1.4 grams of Dowicil 200 (an antimicrobial agent containing a minimum of 94% cis isomer of 1-(3-chloroallyl)-3,5,7-triaza-1-azoniaadamantane chloride, available from Dow Chemical Company) and 1.4 grams of synthetic oil of lavender were added in that order to the solution. The resultant composition was heated to a temperature of about 65°C until a solution was achieved which required approximately 15 minutes. Heating was stopped while stirring was continued for about 1 minute while the vapor in the flask subsided. Thereafter, 46.9 grams of polyvinylpyrrolidone having a molecular weight of 360,000 was added to the solution while it was heated to about 65°C and the solution was stirred until homogeneous. This required approximately 30 minutes. Heating and agitation then were ceased until the vapors had subsided. Finally, 141.4 grams of polyvinylpyrrolidone having a molecular weight of 40,000 was added to the solution while it was heated and agitated until the newly-added polyvinylpyrrolidone was in solution. The resultant composition was relatively viscous but was pourable.

The viscous hot material then was poured into polypropylene containers having a volume of about 12 c.c. and was allowed to cool therein. After the adhesive had cooled to room temperature, it was in the form of a mechanically stable adhesive stick which could be rubbed onto a paper substrate without excessive rubbing pressures and without causing excess metering of adhesive. When rubbed on paper, the adhesive applied thereto could be employed to bond a second sheet of paper which formed a tear bond within less than twenty seconds.

The composition was tested to determine its tear bond strength within varying periods of 24, 28 and 72 hours after initial application at room temperature, after being exposed to 110°F in an oven or when placed in a desiccator. Of 112 specimens tested, significant paper tear was noted when the two paper sheets adhered with the composition were peeled apart slowly in 108 specimens. The number of bond failures for each test specimen was zero. Thus, the adhesive is stable to normal atmospheric conditions, at relatively high tempertures and under relatively dry conditions.

was added while the solution was heated to 160–165°F. The NaOH was added to prevent formation of ferric hydroxide. The Dowicil 200, PVP K-30, PVP K-90 and UVINOX 1494 then were added to the mixture while it was heated and the resultant mixture was stirred until homogeneous. The viscous hot material then was poured into polypropylene containers having a volume of about 12 c.c. and was allowed to cool therein. After the adhesive had cooled to room temperature, it was in the form of a mechanically stable adhesive stick which could be rubbed onto a paper substrate without excessive rubbing pressures and without excess metering of adhesive. When rubbed on paper, the adhesive applied thereto could be employed to bond a second sheet of paper which formed a tear bond within less than twenty seconds.

Table I

| INGREDIENT | 1 | 2 | 3 | 4 | 5 | 6 | 7 |
|---|---|---|---|---|---|---|---|
| Demineralized Water | 74.4* | 74.4 | 74.4 | 74.4 | 74.4 | 74.4 | 74.4 |
| Glycerine | 27.0 | 27.0 | 27.0 | 27.0 | 27.0 | 27.0 | 27.0 |
| Ethyl Alcohol | 96.3 | 96.3 | 96.3 | 96.3 | 96.3 | 96.3 | 96.3 |
| Sequestrene ST | 10.2 | 10.2 | 10.2 | 10.2 | 10.2 | | 10.2 |
| Triethanolamine | | | | | | 10.2 | |
| Dowicil 200 | 0.6 | 0.6 | 0.6 | 0.6 | 0.6 | 0.6 | 0.6 |
| UVINOX 1494 | 1.2 | 1.2 | 1.2 | 1.2 | 1.2 | 1.2 | 1.2 |
| PVP K-30 | 60.6 | 60.6 | 60.6 | 60.6 | 60.6 | 60.6 | |
| PVP K-90 | 20.1 | 20.1 | 20.1 | 20.1 | 20.1 | 20.1 | |
| Elvanol 51-05 | | | | | | | 80.7 |
| Calcium Stearate | 10.2 | | | | | | 10.2 |
| Aluminum Stearate | | 10.2 | | | | | |
| Zinc Stearate | | | 10.2 | | | | |
| Cadmium Stearate | | | | 10.2 | | | |
| Iron Stearate | | | | | 10.2 | 10.2 | |
| Sodium Hydroxide | | | | | | 9.4 | |

*All weights in grams

The adhesive formed by the process of this example has a melting point of 172°F which is above expected normal storage conditions. This melting point is a useful characteristic in that the composition can be remelted during processing at any time to fill holders and form the adhesive stick.

EXAMPLE II

Each of the compositions shown in Table I was prepared in accordance with the preferred process for forming the composition of this invention.

To a one liter three-necked flask provided with a thermometer and a stirrer was added the water, glycerine and ethyl alcohol which was stirred until uniform. The Sequestrene ST (tetrasodium ethylenediaminetetraacetate dihydrate available from Ciba-Geigy) then was added to the solution followed by the Dowicil 200 and the resultant mixture was stirred, without heating, until uniform. The PVP K-30 (polyvinylpyrrolidone having an average molecular weight of 40,000) and PVP K-90 (polyvinylpyrrolidone having an average molecular weight of 360,000) or Elvanol 51-05 (polyvinyl alcohol) then were added to the mixture and the resultant mixture was stirred until homogeneous. The acid metal salt and UVINOX 1494 (a liquid alkylated hindered phenolic primary antioxidant available from GAF Corporation) then were added to the mixture which was heated to 160°–165°F until they were dissolved.

Composition 6 was prepared as follows: To a one liter three-necked flask provided with a thermometer and a stirrer was added the water, glycerine and ethyl alcohol which was stirred until uniform. The triethanolamine then was added to the solution. The iron stearate then In a preferred aspect of this invention, the liquid composition is maintained at a pH of between about 9.7 and 11.0 in order to minimize the possibility of the gel becoming soft, generally by the addition of an alkali metal hydroxide, e.g. sodium hydroxide. However, it should be noted that the alkali metal hydroxide is added in a concentration far less than would be required to form alkali metal salts of the carboxylic acid. Furthermore, the use of the alkali metal hydroxide is not necessary since satisfactory hard gels can be made without the alkali metal hydroxide.

We claim:

1. A remeltable adhesive composition comprising:
   a metal salt of an aliphatic carboxylic acid having from 8 to 36 carbon atoms, the metal portion of said metal salt being selected from the group consisting of Group II metals and Group III metals;
   a liquid dispersant;
   a water soluble chelating agent in an amount sufficient to chelate the metal portion of the carboxylic acid salt to render the carboxylic acid salt soluble in the liquid dispersant;
   and, a polyvinylpyrrolidone adhesive having a molecular weight between the range of 40,000 to 360,000.

2. The composition of claim 1 wherein the metal salt is calcium stearate.

3. The composition of claim 2 wherein the liquid dispersant is selected from the group consisting of organic solvents, water, and a mixture of water and a water-miscible organic solvents.

4. The composition of claim 3 wherein the chelating agent is the tetrasodium salt of ethylenediaminetetraacetic acid.

5. An adhesive stick applicator comprising: a remeltable adhesive composition comprising;
   a metal salt of an aliphatic carboxylic acid having from 8 to 36 carbon atoms, the metal portion of said metal salt being selected from the group consisting of Group II metals, and Group III metals,
   a liquid dispersant,
   a water soluble chelating agent in an amount sufficient to chelate the metal portion of the carboxylic acid salt to render the carboxylic acid salt soluble in the liquid dispersant, and
   a polyvinylpyrrolidone adhesive having a molecular weight between the range of 40,000 to 360,000; a relatively vapor impermeable housing enclosing said adhesive composition; and,
   means to expose said adhesive composition enclosed in said housing to enable said adhesive composition to be applied onto a substrate.

6. The adhesive stick applicator of claim 5 wherein the metal salt is calcium stearate.

7. The adhesive stick applicator of claim 6 wherein the liquid dispersant is selected from the group consisting of water, a mixture of water and water-miscible organic solvents, and organic solvents.

8. The adhesive stick applicator of claim 7 wherein the chelating agent is the terasodium salt of ethylenediaminetetraacetic acid.

9. A composition suitable for use as a gel carrier comprising a metal salt of an aliphatic carboxylic acid having from 8 to 36 carbon atoms, the metal portion of said metal salt being selected from the group consisting of Group II metals and Group III metals, a liquid dispersant and a water soluble chelating agent in an amount sufficient to chelate the metal portion of the carboxylic acid salt to render the carboxylic acid salt soluble in the liquid dispersant.

10. The composition of claim 9 wherein the metal salt is calcium stearate.

11. The composition of claim 10 wherein the liquid dispersant is selected from the group consisting of organic solvents, water, and a mixture of water and water-miscible oganic solvents.

12. The composition of claim 11 wherein the chelating agent is the tetrasodium salt of ethylenediaminetetraacetic acid.

13. The composition of claim 4 wherein the liquid dispersant comprises between about 40 and about 80 weight percent of the adhesive composition.

14. The composition of claim 4 wherein the weight ratio of acid salt to chelting agent is between about 0.5:1 and about 2:1.

15. The composition of claim 1 wherein the metal salt is aluminum stearate.

16. The composition of claim 1 wherein the metal salt is zinc stearate.

17. The composition of claim 1 wherein the metal salt is cadmium stearate.

18. The composition of claim 1 wherein the metal salt is iron stearate.

19. The composition of claim 9 including the adhesive polymer vinyl alcohol.

20. The composition of claim 1 wherein the adhesive composition further comprises an alkali metal hydroxide in a concentration far less than would be required to form alkali salts of the carboxylic acid but sufficient to provide a sufficiently harder gel.

21. The composition of claim 5 wherein the adhesive composition further comprises an alkali metal hydroxide in a concentration far less than would be required to form alkali salts of the carboxylic acid but sufficient to provide a sufficiently harder gel.

22. The composition of claim 9 wherein the adhesive composition further comprises an alkali metal hydroxide in a concentration far less than would be required to form alkali salts of the carboxylic acid but sufficient to provide a sufficiently harder gel.

23. The composition of claim 4 wherein the liquid dispersant comprises a mixture of demineralized water, glycerine, and ethyl alcohol.

24. The gel composition of claim 9 wherein the chelating agent is selected from the group consisting of the tetrasodium salt of ethylenediaminetetraacetic acid and tetrasodium ethylenediaminetetraacetate dihydrate.

25. The gel composition of claim 24 wherein the metal salt is calcium stearate.

26. The gel composition of claim 25 wherein the liquid dispersant is a mixture of demineralized water, glycerine, and ethyl alcohol.

27. The gel composition of claim 9 wherein the metal salt is aluminum stearate.

28. The gel composition of claim 9 wherein the metal salt is cadmium stearate.

29. The gel composition of claim 9 wherein the metal salt is iron stearate.

* * * * *